United States Patent [19]
Kim et al.

[11] Patent Number: 5,881,273
[45] Date of Patent: Mar. 9, 1999

[54] CLOCK SIGNAL GENERATION APPARATUS FOR USE IN AN ACCESS SUBSYSTEM PROCESSOR

[75] Inventors: Jae-Peoung Kim; Jong-Hwan Oh, both of Incheon, Rep. of Korea

[73] Assignee: Daewoo Telecom, Incheon, Rep. of Korea

[21] Appl. No.: 866,311

[22] Filed: May 30, 1997

[30] Foreign Application Priority Data

May 31, 1996 [KR] Rep. of Korea .................. 1996-19395

[51] Int. Cl.$^6$ ....................................................... G06F 1/06
[52] U.S. Cl. ............................................................ 395/556
[58] Field of Search .................................... 395/555, 556

[56] References Cited

U.S. PATENT DOCUMENTS 4,993,026 2/1991 Yamashita ................................ 370/540
5,682,112 10/1997 Fukushima ............................... 327/147

*Primary Examiner*—Thomas M. Heckler
*Attorney, Agent, or Firm*—Pennie & Edmonds LLP

[57] ABSTRACT

An apparatus generates a set of a reference clock pulse and a reference frame pulse signals (RCPS and RFPS) for use in an access subsystem processor of an electronic switching system. At first, a set of a clock pulse and a frame pulse signals (CPS and FPS) generated from a processor associated with the apparatus is received and converted into a converted set of a RCPS and a RFPS. Next, a functional fail signal is obtained based on processor and signal status information from the link processor. Finally, the converted set of the RCPS and the RFPS, converted sets of RCPS's and RFPS's issued by the remainder of N local data link processors in each link module and converted sets of RCPS's and RFPS's from the subsystem processor are received and processed to generate a predetermined converted set of a RCPS and a RFPS as the set of the RCPS and the RFPS at an initial time regardless of the functional fail signal, and select one of the converted sets of the RCPS's and the RFPS's after the initial time in response to the functional fail signal to thereby provide the selected converted set of the RCPS and the RFPS as the set of the RCPS and the RFPS.

10 Claims, 3 Drawing Sheets

CLOCK SIGNAL GENERATION APPARATUS FOR USE IN AN ACCESS SUBSYSTEM PROCESSOR

FIELD OF THE INVENTION

The present invention relates to an electronic switching system; and, more particularly, to an apparatus for effectively generating a set of a reference clock pulse and a reference frame pulse signals for use in an access subsystem processor contained in the switching system.

BACKGROUND OF THE INVENTION

As is well known, an electronic switching system (ESS) selectively connects two assigned subscribers out of many so as to establish a communication line between them.

Basic components of the ESS include a multiplicity of access subsystem processors, an interconnection subsystem processor and a central control subsystem processor. Each access subsystem processor includes a plurality of subscriber interfacing units, time division switching units and local data link modules to communicate information between two selected subscribers, wherein the number of the time division switching units and the local data link modules is decided based on the required capacity of the ESS.

When the two selected subscribers are coupled with a single access subsystem processor, they are connected within the same access subsystem processor. On the other hand, when the two selected subscribers are coupled with two separate access subsystem processors, they are connected through the interconnection subsystem processor. The interconnection subsystem processor, coupled with each of the access subsystem processors and the central control subsystem processor, includes a central data link module and a space division switching unit; and connects the two selected subscribers. Finally, the central control subsystem processor coupled with the access subsystem processors and the interconnection subsystem processor controls all the operations and maintenance processes of the ESS.

However, in order to efficiently communicate information between the connected subscribers, there are generally incorporated, N, e.g., 2, local data link processors within each local data link module instead of one, N being a positive integer greater than 1. When an active local data link processor is malfunctioning, the operation mode of the malfunctioning processor is set to be inactive or stand-by and the operation mode of the other is set to be active, thereby guaranteeing a continuous communication of information between the two connected subscribers.

Specifically, each local data link processor includes a plurality of components, e.g., a clock signal generation device, an address generator and the like. Initially, a first set of a clock pulse and a frame pulse signals (CRS and FPS) is issued by a clock and alarm signal generator contained in the clock signal generation device of one of the two local data link processors, wherein, for example, transfer rate of the CPS and FPS in the first set is 65.536 Mhz and 8 Khz, respectively. Further, at the clock and alarm signal generator, an alarm signal is obtained by checking the status of the components in the local data link processor and the status of the CPS in the first set.

Next, a clock selector in the clock signal generation device receives the first set of the CPS and the FPS and the alarm signal, a second set of a CPS and a FPS and an alarm signal issued by a clock and alarm signal generator in a clock signal generation device in the other of the two local data link processors and selects one of the two sets of the CPS's and the FPS's based on the alarm signals applied thereto. Finally, the CPS in the selected set is converted to a signal of a predetermined transfer rate, e.g., 8.192 Mhz; and the FPS therein is converted to a signal with a same transfer rate as that of the CPS, but with a predetermined duty cycle different from that of the CPS. The converted set of the CPS and the FPS is provided to each of the corresponding time division switching unit and the address generator as a set a reference clock pulse and a reference frame pulse signals (RCPS and RFPS) for use therein, wherein the transfer rate of the signals is, e.g., 16.384 Mhz and 8 Khz, respectively.

However, in the conventional clock signal generation device, the set of the RCPS and the RFPS is obtained by sets of CPS's and FPS's and alarm signals which are provided from two clock and alarm signal generators contained in a corresponding local data link module only, without paying due regard to these sets of CPS's and FPS's issued by other local data link modules. Therefore, in case of communicating information between the connected subscribers through two local data link modules, there may occur phase discrepancies in the sets of the RCPS's and the RFPS's obtained by the link modules, thereby resulting in a disconnection between the connected subscribers.

SUMMARY OF THE INVENTION

It is, therefore, a primary object of the present invention to provide an apparatus, for use in a local data link processor of an access subsystem processor in an ESS, for effectively generating a set of a RCPS and a RFPS to thereby improve the quality of telephonic communication between two assigned subscribers.

In accordance with the invention, there is provided a clock signal generation apparatus, for use in a local data link processor of an access subsystem processor in an electronic switching system (ESS), for generating a set of reference clock pulse signal (RCPS) and reference frame pulse signal (RFPS), wherein the access subsystem processor includes a plurality of local data link modules, each link module having N local data link processors, each link processor having means for generating a set of clock pulse signal (CPS) and frame pulse signal (FPS) with a first and a second predetermined transfer rates and means for issuing processor status information representing whether said each link processor is incorporated in a corresponding link module or detached therefrom and signal status information representing the status of the CPS in the set, N being a positive integer larger than 1, the apparatus comprising:

means for receiving a set of CPS and FPS generated from a local data link processor associated with the apparatus and converting the set of CPS and FPS into a converted set of CPS and FPS, wherein the CPS and the FPS in the converted set are transferred at a third and the second predetermined transfer rates, respectively, but the FPS in the converted set has a predetermined duty cycle different from that of the FPS in the set;

means for generating a functional fail signal based on the processor status information and the signal status information generated from the link processor; and means for receiving the converted set of CPS and FPS, converted sets of CPS and FPS issued by the remainder of the N local data link processors in said each link module and converted sets of CPS and FPS from local data link processors in the remainder of the local data link modules, generating a predetermined converted set of CPS and FPS as the set of RCPS and RFPS at an initial time regardless of the functional fail signal, and selecting one of the converted sets of CPS and FPS after the initial time in response to the functional fail signal to thereby provide the selected converted set of CPS and FPS as the set of RCPS and RFPS.

BRIEF DESCRIPTION OF THE DRAWINGS

The above and o her objects and features of the present invention will become apparent from the following description of preferred embodiments given in conjunction with the accompanying drawings in which.

DETAILED DESCRIPTION OF THE PREFERRED EMBODIMENTS

Figure 1:
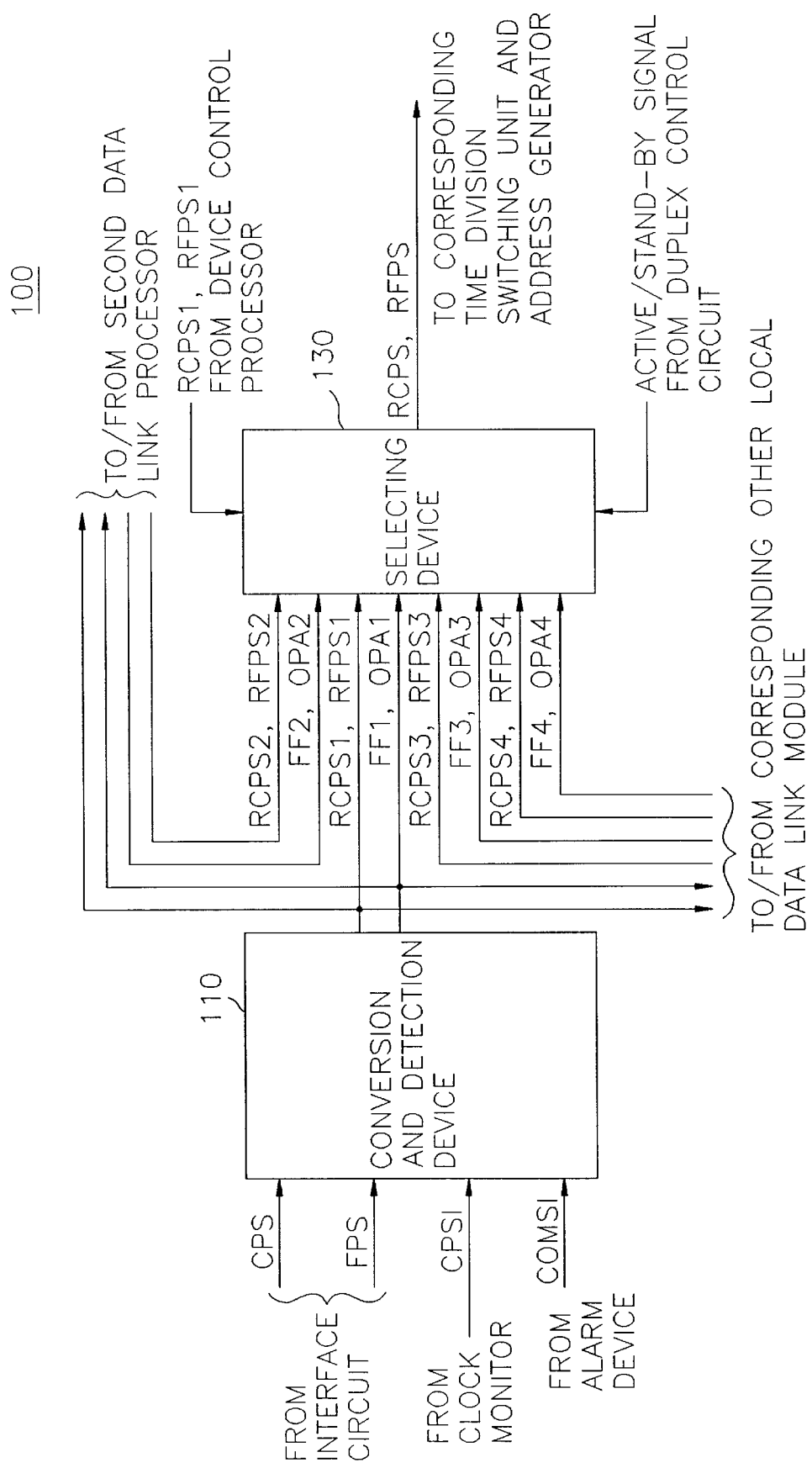
FIG. 1 shows a block diagram of a clock signal generation apparatus of the present invention for use in an access subsystem processor included in an ESS.
Figure 3:
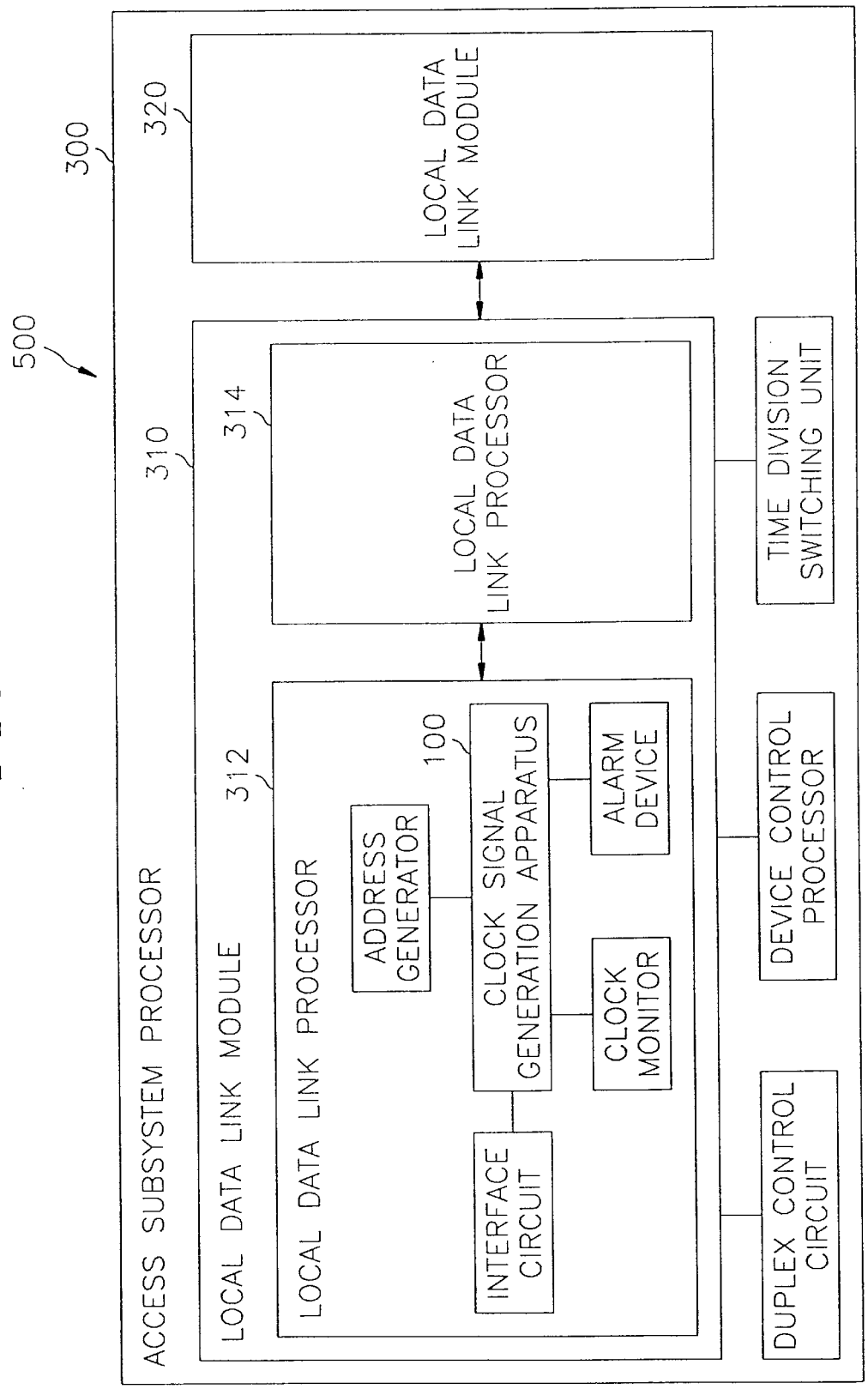
FIG. 3 is a block diagram of an ESS having a clock signal generation apparatus in accordance with the invention.

Referring to FIG. 1, there is depicted a block diagram of a novel apparatus 100 of the present invention for generating a set of a RCPS and a RFPS, for use in an access subsystem processor 300 contained in an ESS 500 as illustrated in FIG. 3. The reference signals RCPS and RFPS in the set are transferred at predetermined transfer rate, e.g., 16.384 Mhz and 8 Khz, respectively. As is well known, there are generally provided N, e.g., 2, local data link processors in each of local data link modules included in the access subsystem processor for reliability of the communications between them, each processor including a plurality of components, e.g., an interface circuit, an address generator, a clock signal generation apparatus and so on, N being a positive integer larger than 1. It should be noted that the number of the local data link modules being incorporated in the ESS can be decided on the basis of the required capacity of the ESS.

For the sake of simplicity, following description of the present invention will be provided with respect to a clock signal generation apparatus 100 illustrated in FIG. 1, included in one of the two local data link processors, e.g., a first local data link processor 312 as illustrated in FIG. 3. The inventive clock signal generation apparatus 100 comprises a conversion and detection device 110 and a selecting device 130.

As is shown in FIGS. 1 and 3, a set of a CPS and a FPS issued by an interface circuit, signal status information CPSI from a clock monitor representing status of the signal CPS and component status information COMSI from an alarm device representing status of components in the first local data link processor are provided to the conversion and detection device 110. Transfer rate of the signals CPS and FPS are predetermined as, e.g., 19.44 Mhz and 8 Khz, respectively; and the interface circuit, the clock monitor and the alarm device are involved in the first local data link processor 312. First of all, at the conversion and detection device 110, a first set of a reference clock pulse and a reference frame pulse signals RCPS1 and RFPS1 is issued by utilizing the set of the CPS and the FPS inputted thereto. That is, the CPS in the set is converted to the RCPS1 of 16.384 Mhz; and the FPS is converted to the RFPS1 with the same transfer rate as the FPS but with a predetermined different duty cycle.

Thereafter, a first functional fail signal FF1 is generated on the basis of the status information CPSI and COMSI inputted thereto at the device 110, wherein there is employed an OR gate well known in the art. More specifically, for example, if inputs to the device 110 are either the CPSI of logic high level meaning that the CPS is erroneous or the COMSI of logic high level indicating that any of the components in the first local data link processor 312 is not normal, the FF1 of logic high level is issued by the device 110; and, if otherwise, the signal FF1 of logic low level is provided therefrom. Finally, information concerning status of the first local data link processor 312 is derived at the device 110. In accordance with the present invention, an output from the device 110 is a first processor status signal OPA1 of logic high level if it is detached from the local data link module; and OPA1 of logic low level if otherwise, wherein there is used a pull up resistor (not shown) coupled with an output port of the device 110. Subsequently, the RCPS1, the RFPS1, the FF1 and the OPA1 are transferred to the selecting device 130, a second local data link processor 314 in the local data link module 310 and a corresponding other local data link module 320.

Inputs to the selecting device 130 are the RCPS1 and the RFPS1, the FF1 and the OPA1 from the conversion and detection device 110, a second set of a reference clock pulse and a reference frame pulse signals, RCPS2 and RFPS2, a second functional fail signal FF2 and a second processor status signal OPA2 from the second local data link processor, and a third set of a reference clock pulse and a reference frame pulse signals, RCPS3 and RFPS3, a third functional fail signal FF3, a third processor status signal OPA3, a fourth set of a reference clock pulse and a reference frame pulse signals, RCPS4 and RFPS4, a fourth functional fail signal FF4 and a fourth processor status signals OPA4 from two local data link processors, a third and a fourth, in the corresponding other local data link module 320. In addition, an active/stand-by signal issued by a duplex control circuit in the access subsystem processor 300 and one of the four sets of the reference clock pulse and the reference frame pulse signals, e.g., RCPS1 and RFPS1, preset by a device control processor in the access subsystem processor 300 are received by the selecting device 130.

At the selecting device 130, a set of a RCPS and a RFPS is selected from the four sets of the reference clock pulse and the reference frame pulse signals through the use of a novel clock selection scheme of the present invention which will be explained in detail with reference to FIG. 2 below. The set of the RCPS and the RFPS selected is provided to a corresponding time division switching unit in the access subsystem processor 300 and to the address generator in the first local data link processor 312.

Figure 2:
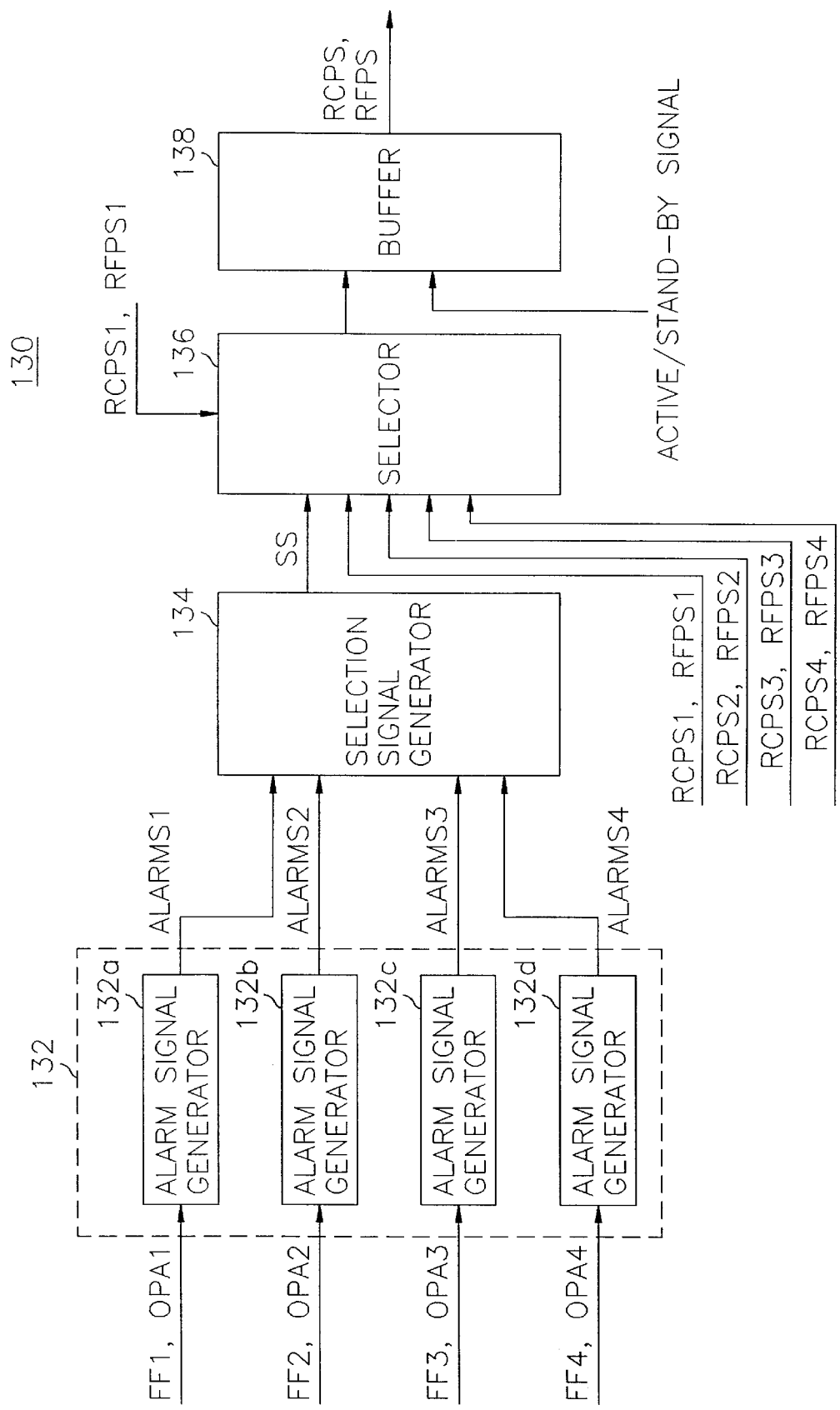
FIG. 2 presents a detailed block diagram of the selecting device shown in FIG. 1.

Turning now to FIG. 2, there is illustrated a detailed block diagram of the selecting device 130 for obtaining the set of the RCPS and the RFPS. The selecting device 130 includes an alarm signal generation unit 132, a selection signal generator 134, a selector 136 and a buffer 138, wherein the unit 132 is provided with a multiplicity of, e.g., 4, alarm signal generators 132a to 132d, each being implemented with an OR gate (not shown).

Inputs to each of the alarm signal generators 132a to 132d are the corresponding functional fail signal and the corresponding processor status signal from the corresponding one of the conversion and detection device 110, the second local data link processor 314 and the two local data link processors, the third and the fourth, in the corresponding other local data link module 320. For example, inputs to the alarm signal generator 132a are the FF1 and the OPA1, both of which are provided from the conversion and detection device 110; and inputs to the alarm signal generator 132c are the FF3 and the OPA3 from a first local data link processor in the corresponding other local data link module 320, the third.

Each of the alarm signal generators produces an alarm signal of logic high or low level depending on the corresponding functional fail signal and the corresponding processor status signal applied thereto. For instance, the alarm signal generator 132a generates a first alarm signal ALARMS1 of logic high level if either the FF1 is a logic high level or the OPA1 is a logic high level; and the ALARMS1 of logic low level if otherwise. Also, the alarm signal generator 132c issues a third alarm signal ALARMS3 of logic high level if any one of the FF3 and the OPA3 is a logic high level; and the ALARMS3 of logic low level if otherwise. Thereafter, the four alarm signals obtained at the alarm signal generators, ALARMS1 to ALARMS4, are supplied to the selection signal generator 134.

At the selection signal generator 134, a selection signal SS, to be used to choose one of the four sets of the RCPS's and the RFPS's which is normal among them, is derived through the use of the four alarm signals applied thereto, wherein a set of a RCPS's and a RFPS's is considered as normal when the alarm signal associated with the set is in low level. If two or more alarm signals are logic low meaning that corresponding sets of RCPS's and RFPS's and corresponding components and processors are normal, the selection signal SS is decided according to an inventive selection decision scheme. For instance, if the first and the second alarm signals are logic low, in the inventive selection scheme, the selection signal with a value designating the RCPS1 and the RFPS1 is chosen among a set of values prestored in the generator 134. Subsequently, the selection signal SS is transferred from the selection signal generator 134 to the selector 136.

Inputs to the selector 136 are the selection signal SS, the four sets of the RCPS's and the RFPS's, i.e., RCPS1 and RFPS1 to RCPS4 and RFPS4, and the RCPS1 and RFPS1 from the device control processor, which is one of the four sets, as set forth above. Specifically, the selector 136 produces the first set of the reference clock pulse and the reference frame pulse signals RCPS1 and RFPS1 at an initial time ($t_o$) regardless of the selection signal SS. After the initial time ($t_o$), the selector 136 outputs one of the four sets of the RCPS's and the RFPS's in response to the selection signal SS and provides the selected set as the reference set.

Thereafter, the selected set of the RCPS and the RFPS is applied to the buffer 138 which stores the set for a predetermined time duration and then reads the set in response to the active/stand-by signal from the duplex control circuit, thereby providing same to the corresponding time division switching unit and the address generator. As a result, the present invention is capable of efficiently generating a reference clock pulse signal and a reference frame pulse signal by using sets of RCPS's and RFPS's provided from local data link modules communicating information between two assigned subscribers, thereby improving the quality of the communications between them.

While the present invention has been shown and described with respect to the particular embodiment, it will be apparent to those skilled in the art that many changes and modifications may be made without departing from the spirit and scope of the invention as defined in the appended claims.

What is claimed is:

1. A clock signal generation apparatus, for use in a local data link processor of an access subsystem processor in an electronic switching system (ESS), for generating a set of a reference clock pulse and a reference frame pulse signals (RCPS and RFPS), wherein the access subsystem processor includes a plurality of local data link modules, each link module having N local data link processors, each link processor having means for generating a set of a clock pulse and a frame pulse signals (CPS and FPS) with a first and a second predetermined transfer rate and means for issuing processor status information representing whether said each link processor is incorporated in a corresponding link module or detached therefrom and signal status information representing the status of the CPS in the set, N being a positive integer larger than 1, said apparatus comprising:

means for receiving a set of a CPS and a FPS generated from a local data link processor associated with the apparatus and converting the set of the CPS and the FPS into a converted set of a RCPS and a RFPS, wherein the RCPS and the RFPS in the converted set are transferred at a third and the second predetermined transfer rate respectively, but the RFPS in the converted set has a predetermined duty cycle different from that of the FPS in the set;

means for generating a functional fail signal based on the processor status information and the signal status information generated from the link processor; and means for receiving the converted set of the RCPS and the RFPS, converted sets of RCPS's and RFPS's issued by the remainder of the N local data link processors in said each link module and converted sets of RCPS's and RFPS's from local data link processors in the remainder of the local data link modules, generating a predetermined converted set of a RCPS and a RFPS as the set of the RCPS and the RFPS at an initial time regardless of the functional fail signal, and selecting one of the converted sets of the RCPS's and the RFPS's after the initial time in response to the functional fail signal to thereby provide the selected converted set of the RCPS and the RFPS as the set of the RCPS and the RFPS.

2. The apparatus of claim 1, wherein the predetermined converted set of the RCPS and the RFPS is one of the converted sets of the RCPS's and the RFPS's.

3. The apparatus of claim 1, wherein said means for generating the functional fail signal is implemented by an OR gate.

4. The apparatus of claim 1, further comprising means for storing temporarily the set of the RCPS and the RFPS, and outputing them in response to an active/stand-by signal issued by a duplex control circuit contained in the ESS.

5. The apparatus of claim 1, wherein N is 2.

6. An electronic switching system comprising:

a clock signal generation apparatus, for use in a local data link processor of an access subsystem processor in said electronic switching system, for generating a set of a reference clock pulse and a reference frame pulse signals (RCPS and RFPS), wherein the access subsystem processor includes a plurality of local data link modules, each link module having N local data link processors, each link processor having means for generating a set of a clock pulse and a frame pulse signals (CPS and FPS) with a first and a second predetermined transfer rate and means for issuing processor status information representing whether said each link processor is incorporated in a corresponding link module or detached therefrom and signal status information representing the status of the CPS in the set, N being a positive integer larger than 1, said apparatus comprising:

means for receiving a set of a CPS and a FPS generated from a local data link processor associated with the apparatus and converting the set of the CPS and the FPS into a converted set of a RCPS and a RFPS, wherein the RCPS and the RFPS in the converted set are transferred at a third and the second predetermined transfer rate, respectively, but the RFPS in the converted set has a predetermined duty cycle different from that of the FPS in the set;

means for generating a functional fail signal based on the processor status information and the signal status information generated from the link processor; and means for receiving the converted set of the RCPS and the RFPS, converted sets of RCPS's and RFPS's issued by the remainder of the N local data link processors in said each link module and converted sets of RCPS's and RFPS's from local data link processors in the remainder of the local data link modules, generating a predetermined converted set of a RCPS and a RFPS as the set of the RCPS and the RFPS at an initial time regardless of the functional fail signal, and selecting one of the converted sets of the RCPS's and the RFPS's after the initial time in response to the functional fail signal to thereby provide the selected converted set of the RCPS and the RFPS as the set of the RCPS and the RFPS.

7. The electronic switching system of claim 6, wherein the predetermined converted set of the RCPS and the RFPS is one of the converted sets of the RCPS's and the RFPS's.

8. The electronic switching system of claim 6, wherein said means for generating the functional fail signal is implemented by an OR gate.

9. The electronic switching system of claim 6, further comprising means for storing temporarily the set of the RCPS and the RFPS, and outputting them in response to an active/stand-by signal issued by a duplex control circuit contained in said electronic switching system.

10. The electronic switching system of claim 6, wherein N is 2.

* * * * *